(12) United States Patent
Yacoub

(10) Patent No.: US 9,328,642 B2
(45) Date of Patent: May 3, 2016

(54) INTERNAL COMBUSTION ENGINE WITH SELECTIVE CATALYTIC CONVERTER FOR THE REDUCTION OF NITROGEN OXIDES AND METHOD FOR OPERATING AN INTERNAL COMBUSTION ENGINE OF SAID TYPE

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 14/177,964

(22) Filed: Feb. 11, 2014

(65) Prior Publication Data

US 2014/0223902 A1 Aug. 14, 2014

(30) Foreign Application Priority Data

Feb. 13, 2013 (DE) .......................... 10 2013 202 297

(51) Int. Cl.

| F01N 3/00 | (2006.01) |
|---|---|
| F01N 3/08 | (2006.01) |
| F02B 37/18 | (2006.01) |
| F01N 3/10 | (2006.01) |
| F01N 3/20 | (2006.01) |
| F01N 3/035 | (2006.01) |
| F01N 13/00 | (2010.01) |

(52) U.S. Cl.
CPC .............. *F01N 3/0878* (2013.01); *F01N 3/035* (2013.01); *F01N 3/0821* (2013.01); *F01N 3/103* (2013.01); *F01N 3/208* (2013.01); *F01N 3/2013* (2013.01); *F01N 3/2066* (2013.01); *F01N 13/0093* (2014.06); *F01N 13/0097* (2014.06); *F02B 37/18* (2013.01); *F01N 13/009* (2014.06); *F01N 2240/20* (2013.01); *F01N 2240/36* (2013.01); *F01N 2240/40* (2013.01); *F01N 2410/12* (2013.01); *F01N 2610/02* (2013.01); *F01N 2610/1453* (2013.01); *Y02T 10/144* (2013.01); *Y02T 10/24* (2013.01); *Y02T 10/26* (2013.01)

(58) Field of Classification Search
CPC ...... F01N 3/0878; F01N 3/103; F01N 3/2066
USPC .................... 60/320, 299, 295, 297, 301, 286
See application file for complete search history.

(56) References Cited

U.S. PATENT DOCUMENTS

| 6,843,966 | B1 | 1/2005 | Mahr | |
|---|---|---|---|---|
| 2005/0013756 | A1* | 1/2005 | Amou et al. | ................ 423/239.1 |
| 2008/0041053 | A1* | 2/2008 | Doring et al. | ................... 60/612 |

(Continued)

FOREIGN PATENT DOCUMENTS

| DE | 102004036036 A1 | 3/2006 |
|---|---|---|
| DE | 102007061005 A1 | 6/2009 |
| DE | 102011005654 A1 | 9/2012 |

*Primary Examiner* — Audrey K Bradley
*Assistant Examiner* — Anthony Ayala Delgado
(74) *Attorney, Agent, or Firm* — Julia Voutyras; Alleman Hall McCoy Russell & Tuttle LLP (57) ABSTRACT

An internal combustion engine comprising a turbocharger wherein a bypass line in an exhaust gas discharge system delivers an aqueous urea reductant to an at least one SCR catalyst and a method to maintain the reductant at a desired temperature to maximize its conversion to ammonia and optimize the reduction of NOx in the SCR.

18 Claims, 6 Drawing Sheets

(56) References Cited

U.S. PATENT DOCUMENTS

2008/0223019 A1* 9/2008 Gonze et al. .................. 60/286
2011/0146267 A1 6/2011 Hepburn et al.
2011/0165640 A1* 7/2011 Mueller et al. ................ 435/135

* cited by examiner

INTERNAL COMBUSTION ENGINE WITH SELECTIVE CATALYTIC CONVERTER FOR THE REDUCTION OF NITROGEN OXIDES AND METHOD FOR OPERATING AN INTERNAL COMBUSTION ENGINE OF SAID TYPE

CROSS REFERENCE TO RELATED APPLICATIONS

The present application claims priority to German Patent Application No. 102013202297.2, filed on Feb. 13, 2013, the entire contents of which are hereby incorporated by reference for all purposes.

BACKGROUND/SUMMARY

To reduce NOx emissions a selective catalytic reduction (SCR) catalyst may be used in an exhaust gas discharge system. A reductant is injected upstream of the SCR catalyst. The NOx will react with the reductant, or the reductants products, in the SCR catalyst to create byproducts such as nitrogen and water.

One example approach is to inject the reductant downstream of a turbine on a turbocharger and upstream of the SCR catalyst. Specifically, the reductant is injected into exhaust flow coming out of the turbo. Another approach is to inject the reductant upstream of both the turbocharger and the SCR catalyst. As a reductant, ammonia NH3 and urea are commonly used. Further, use may be made of HC enrichment with unburned hydrocarbons being introduced directly into the exhaust gas discharge system.

One of the problems with the above approaches recognized by the inventors is temperature regulation in the SCR catalyst. At low temperatures the NOx may not be reacted and released to the atmosphere. Close coupling of the exhaust gas aftertreatment systems and the SCR catalyst can lead to high temperatures which release ammonia and NOx without reduction. Another problem recognized is the exhaust gas flow rate is only dependent on the engine operating conditions and cannot be controlled to promote better decomposition of the injected reductant. Further to decompose urea to ammonia requires a narrow temperature range of the exhaust gases. Another problem is with introducing unburned hydrocarbons directly which requires extra fuel thereby increasing fuel consumption.

One solution relates to an internal combustion engine comprising an intake system for the supply of charge air and an exhaust-gas discharge system for the discharge of the exhaust gases. Wherein the exhaust-gas discharge system further comprises at least one selective catalytic converter arranged in the exhaust-gas discharge system, which serves for the reduction of nitrogen oxides, and an oxidation catalytic converter being arranged, as a further exhaust-gas aftertreatment system, in the exhaust-gas discharge system upstream of the at least one selective catalytic converter. Further a bypass line branches off from the exhaust-gas discharge system upstream of the oxidation catalytic converter and issues into the exhaust-gas discharge system again between the oxidation catalytic converter and the at least one selective catalytic converter; and a dosing device being provided for introducing liquid urea as a reducing agent for the at least one selective catalytic converter into the bypass line. The virtue of low mass flow rates of the overall exhaust gas flow in the bypass line 8 as opposed to the main exhaust line promotes longer residence time and better decomposition of the injected reductant.

Another solution relates to a method for controlling an engine having a turbocharger with a turbine positioned in the engine exhaust and a selective catalytic reducer (SCR) positioned downstream of the turbine comprising injecting a reductant into the SCR and controlling the temperature of the reductant by portioning an exhaust flow into said reductant between a portion of engine exhaust from upstream of the turbine and another portion of engine exhaust from downstream of the turbine.

A method for controlling nitrogen oxide emissions from an engine having a turbocharger with a turbine positioned in the engine exhaust and a selective catalytic reducer (SCR) positioned downstream of the turbine comprising controlling a wastegate valve positioned on a first bypass line segment between the engine exhaust and the turbine to divert a portion of exhaust gases from the turbine to maintain a desired engine torque. Further, controlling injection of urea into the SCR through a urea dosing element positioned in an exhaust as dosing line coupled to the SCR, said exhaust gas dosing line receiving exhaust flow from said first bypass line and receiving exhaust flow from a second bypass line positioned downstream of the turbine exhaust and controlling the temperature of said urea dosing element by controlling a control element coupled to said first and said second bypass lines to portion exhaust flow into said exhaust gas dosing line between exhaust flow from said first bypass line and exhaust flow from said second bypass line.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An internal combustion engine comprising an intake system for the supply of charge air and an exhaust-gas discharge system for the discharge of the exhaust gases wherein the exhaust-gas discharge system further comprises at least one selective catalytic reduction (SCR) catalyst and which serves for the reduction of nitrogen oxides is disclosed. As a further exhaust-gas aftertreatment system in the exhaust-gas discharge system upstream of the at least one selective catalytic converter an oxidation catalytic converter is arranged.

A method for operating an internal combustion engine of the above-stated type is also disclosed. An internal combustion engine is used for example as a drive of a motor vehicle. It will be appreciated that the expression "internal combustion engine" encompasses diesel engines and applied-ignition engines and also hybrid internal combustion engines, which utilize a hybrid combustion process, and hybrid drives which comprise not only the internal combustion engine but also an electric machine which is connected in terms of drive to the internal combustion engine and which receives power from the internal combustion engine or which, as a switchable auxiliary drive, outputs additional power.

According to the prior art, to reduce the pollutant emissions, internal combustion engines are equipped with various exhaust-gas aftertreatment systems. In applied-ignition engines, use is made of catalytic reactors which, through the use of catalytic materials, increase the rate of certain reactions. This better enables oxidation of HC and CO, even at low temperatures. If nitrogen oxides $NO_x$ are additionally to be reduced, this may be achieved through the use of a three-way catalytic converter, which requires stoichiometric operation ($\lambda \approx 1$) of the applied-ignition engine within narrow limits. Here, the nitrogen oxides $NO_x$ are reduced by means of the non-oxidized exhaust-gas components which are present, specifically the carbon monoxides CO and the unburned hydrocarbons HC, wherein said exhaust-gas components are oxidized at the same time.

In internal combustion engines which are operated with an excess of air, for example direct-injection diesel engines or lean-burn applied-ignition engines, the nitrogen oxides $NO_x$ in the exhaust gas cannot be reduced out of principle, that is to say on account of the lack of a reducing agent.

For this reason, it is necessary to provide an exhaust-gas aftertreatment system for the reduction of the nitrogen oxides, for example a selective catalytic converter, also referred to as SCR catalytic converter, in which a reducing agent is introduced into the exhaust gas in a targeted manner in order to selectively reduce the nitrogen oxides. As the reducing agent, in addition to ammonia $NH_3$ and urea, use may also be made of unburned hydrocarbons. The latter is also referred to as HC enrichment, with the unburned hydrocarbons being introduced directly into the exhaust-gas discharge system or else by means of engine-internal measures, for example by means of a post-injection of additional fuel into the combustion chamber. Here, the post-injected fuel should not be ignited in the combustion chamber by the main combustion which is still taking place or by the—even after the end of the main combustion—high combustion gas temperatures, but rather should be introduced into the exhaust-gas discharge system upstream of the selective catalytic converter during the charge exchange.

Internal combustion engines which utilize post-injection are inherently susceptible to thinning or contamination of the oil with unburned hydrocarbons. Depending on the post-injected fuel quantity and the injection time, a greater or lesser fraction of the post-injected fuel impinges on the cylinder internal wall, mixes there with the adherent oil film, and thus contributes to the thinning of the oil. Furthermore, out of principle, the use of additional fuel as reducing agent increases the overall fuel consumption of the internal combustion engine.

Therefore, for the reduction of nitrogen oxides, use is increasingly being made of selective catalytic converters in which ammonia or urea is provided as reducing agent.

Ammonia, $NH_3$, is generally not stored in motor vehicles or provided as reducing agent in pure form due to toxicity. Rather, urea is often used as a precursor product for the production of ammonia due to stability. Urea can, with a supply of energy, be split into ammonia and isocyanic acid in a thermolytic reaction, wherein further ammonia $NH_3$ can be obtained from the isocyanic acid in the presence of water.

In the case of urea being provided for producing ammonia, it is possible to make a distinction between two approaches which differ fundamentally from one another. In one approach, the urea may be stored and provided as an aqueous urea solution. The urea then introduced as an aqueous solution into the exhaust gas upstream of the selective catalytic converter. In another approach, it is possible for the urea to be provided in solid form. Urea in the solid form takes up less volume and is characterized by a higher ammonia content in relation to the aqueous solution. The storage vessel can therefore be formed with a smaller storage volume, which is a significant advantage in particular with regard to use in motor vehicles, in which it is sought to achieve the densest and most effective packaging possible.

Both concepts require the introduction of heat into the urea in order to produce ammonia. This may pose problems in certain operating modes. For example, if an aqueous urea solution is introduced into the exhaust gas upstream of a selective catalytic converter, exhaust-gas temperatures of approximately 150° C. to 170° C. are necessary to produce ammonia from the urea solution and adequately mix said ammonia, which serves as the reducing agent, with the exhaust gas such that as homogeneous as possible an exhaust-gas/ammonia mixture is formed and flows through the catalytic converter.

In the case of diesel engines in inner-city traffic difficulties can be encountered in generating or attaining exhaust-gas temperatures of the above-mentioned required magnitude. It must be considered here that, normally, exhaust-gas temperatures of only 100° C. are attained at idle. Further internal combustion engines require a certain warm-up phase after a cold start in order for the individual exhaust-gas aftertreatment systems to reach their operating temperature and convert pollutants.

Selective catalytic converters can not only reduce nitrogen oxides in the presence of a reducing agent, for example ammonia, but in the presence of suitable temperatures can also absorb and store ammonia and, when required, release said ammonia again for the reduction of nitrogen oxides. To be able to absorb ammonia, certain minimum temperatures of the catalytic converter are required. In general, catalytic converter temperatures of between 180° C. and 300° C. are sought in order to ensure satisfactory exhaust-gas aftertreatment by means of an SCR catalytic converter.

The statements made above give the impression that it is advantageous for selective catalytic converters to be arranged as close as possible to the outlet of the internal combustion engine, that is to say in a close-coupled position, in order that the exhaust gases are given little time and opportunity to cool down and in order to ensure that the catalytic converter reaches its operating temperature as quickly as possible, in particular after a cold start of the internal combustion engine.

Here, however, it must be borne in mind that an internal combustion engine generally has further exhaust-gas aftertreatment systems, the close-coupled arrangement of which may be of even greater relevance. For example, an oxidation catalytic converter is commonly arranged as a first exhaust-gas aftertreatment system in the exhaust-gas discharge system. The oxidation catalytic converter serves to oxidize the incompletely burned combustion products, specifically the carbon monoxides CO and the unburned hydrocarbons HC. Here, a close-coupled arrangement of the oxidation catalytic converter is essential in order that the untreated emissions of carbon monoxide and unburned hydrocarbons, which are high after a cold start, are lowered in an effective manner and fast heating of the oxidation catalytic converter after a cold start is ensured.

If a regenerative particle filter is used for the reduction of the soot particle emissions, high temperatures of approximately 550° C. are required for the regeneration of the particle filter. If catalytic assistance is not provided, such high temperatures may be attained during operation only at high loads and at high engine speeds. As close-coupled an arrangement as possible is thus also expedient with regard to a particle filter.

It must also be considered that a selective catalytic converter releases absorbed ammonia at very high catalytic converter temperatures above approximately 400° C., without nitrogen oxides being reduced. Both the released ammonia and also the untreated, nitrogen-oxide-containing exhaust gas are then discharged via the exhaust-gas discharge system into the environment.

Even though the present regulations do not imperatively require on-board diagnosis (OBD), future limit values for nitrogen oxide emissions prescribed by legislators could make this necessary. For example, the EURO VI regulation prescribes the monitoring of nitrogen oxide untreated emissions. In particular, on-board diagnosis (OBD), specifically the monitoring of the ammonia concentration in the after-treated exhaust gas, could become essential for reliably preventing ammonia from being introduced into the environment.

The technical relationships described above make it clear that concepts are required which enable selective catalytic converters to be operated in optimum fashion with regard to the most effective possible exhaust-gas aftertreatment of an internal combustion engine. Such concepts should in particular be able to influence the exhaust-gas temperature of the exhaust gas to be treated, and thus the temperature of the catalytic converter, in order to ensure high-quality exhaust-gas aftertreatment, that is to say an effective reduction of nitrogen oxides.

In one example the above issues may be at least party addressed by providing an internal combustion engine according to the preamble of claim 1, which is optimized with regard to the operation of the at least one selective catalytic converter. In another example a method for operating an internal combustion engine of said type is provided.

The first sub-object is achieved by means of an internal combustion engine which has an intake system for the supply of charge air and has an exhaust-gas discharge system for the discharge of the exhaust gases and has at least one selective catalytic converter which is arranged in the exhaust-gas discharge system and which serves for the reduction of nitrogen oxides, an oxidation catalytic converter being arranged, as a further exhaust-gas aftertreatment system, in the exhaust-gas discharge system upstream of the at least one selective catalytic converter, wherein a bypass line branches off from the exhaust-gas discharge system upstream of the oxidation catalytic converter and issues into the exhaust-gas discharge system again between the oxidation catalytic converter and the at least one selective catalytic converter, a dosing device being provided for introducing liquid urea as a reducing agent for the at least one selective catalytic converter into the bypass line.

In the case of the internal combustion engine according to the invention, it is possible for the selective catalytic converter to be impinged on directly with exhaust gas, while further exhaust-gas aftertreatment systems situated upstream of the catalytic converter are bypassed. Here, when required, the exhaust gas is at least partially conducted directly to the selective catalytic converter, past the further exhaust-gas aftertreatment systems, via a bypass line.

By means of said method, i.e. the opening of the bypass line for the passage of exhaust gas, the thermal inertia of that part of the exhaust-gas discharge system which is situated between the outlet of the internal combustion engine, that is to say the outlet openings of the cylinders, and the selective catalytic converter is reduced or minimized, specifically by virtue of the mass and the length of said part being reduced. This attenuates to a great extent the cooling of the exhaust gas that would occur if said exhaust gas were to flow through the exhaust-gas discharge system.

In this way, the exhaust-gas temperature of the exhaust gas to be treated and the temperature of the catalytic converter can be raised in a targeted manner, for example in inner-city traffic, if the relatively low exhaust-gas temperatures hinder or prevent effective exhaust-gas aftertreatment.

It is also possible to realize the exhaust-gas temperatures of approximately 150° C. to 170° C. which are required to evaporate the urea solution, which according to the invention is introduced in aqueous form into the exhaust gas, and generate ammonia, specifically by bypassing the further exhaust-gas aftertreatment system in the bypass line, for which reason, according to the invention, the dosing device for the introduction of the urea solution is provided in the bypass line.

The latter also leads to advantages in terms of the structural design of the exhaust-gas discharge system because the arrangement of the dosing device in the bypass line makes it possible for the selective catalytic converter, and possibly the further exhaust-gas aftertreatment systems, to be arranged in a close-coupled or more close-coupled manner.

However, if the exhaust-gas temperatures increase to a critical level owing to the present operation of the internal combustion engine, for example to such an extent that ammonia which is absorbed in the catalytic converter and which serves as reducing agent is released in uncontrolled fashion owing to an excessively high catalytic converter temperature and could pass via the exhaust-gas discharge system into the environment, the exhaust gas can, by virtue of the bypass line being closed, be conducted again through the further exhaust-gas aftertreatment systems which are situated upstream of the selective catalytic converter, whereby the thermal inertia of that part of the exhaust-gas discharge system which is situated between the outlet of the internal combustion engine and the catalytic converter is increased and the exhaust gas temperature and the catalytic converter temperature are reduced.

The first sub-object on which the invention is based, that is to say the provision of an internal combustion engine according to the preamble of claim 1 which is optimized with regard to the operation of the at least one selective catalytic converter, is achieved by means of the internal combustion engine according to the invention.

For effective exhaust-gas aftertreatment, it is generally necessary for multiple exhaust-gas aftertreatment systems to be provided. For which reason an oxidation catalytic converter is provided for the aftertreatment of the carbon monoxides and the unburned hydrocarbons. Said at least one further exhaust-gas aftertreatment system is arranged in the exhaust-gas discharge system upstream of the at least one selective catalytic converter.

A close-coupled arrangement of the oxidation catalytic converter ensures fast heating of the oxidation catalytic converter, or basically that the required operating temperature is attained and maintained. The oxidation processes that take place in the oxidation catalytic converter can be utilized to raise the exhaust-gas temperatures upstream of the at least one SCR catalytic converter.

Further advantageous embodiments of the internal combustion engine according to the subclaims will be explained below.

Embodiments of the internal combustion engine are advantageous in which a mixer is provided in the bypass line downstream of the dosing device.

For effective exhaust-gas aftertreatment, the ammonia that is produced with the introduction of the aqueous urea solution and which serves as reducing agent should be adequately mixed with the exhaust gas. As homogeneous as possible an exhaust gas-ammonia mixture should advantageously be formed and flow through the catalytic converter.

Here, embodiments of the internal combustion engine are advantageous in which the mixer is heatable.

By means of a heatable mixer, the exhaust-gas temperatures can be raised, and thus the exhaust-gas temperatures required for the evaporation of the aqueous urea solution can be ensured or generated when required. For this purpose, the mixer advantageously comprises a heatable grate or mesh through which the exhaust gas flows. The grate or mesh serves for heating the exhaust gas and simultaneously for the mixing of exhaust gas and reducing agent.

Embodiments of the internal combustion engine are advantageous in which an electrically heatable oxidation catalytic converter is provided in the bypass line upstream of the dosing device. The oxidation catalytic converter serves for the oxidation of the incompletely burned exhaust-gas constituents, predominantly the carbon monoxide and the unburned hydrocarbons. The reactions that take place during the course of the oxidation are exothermic, for which reason the exhaust-gas temperature increases as a result of the oxidation processes. The oxidation catalytic converter arranged upstream of the dosing device is thus a suitable means for raising the exhaust-gas temperature, for which reason said oxidation catalytic converter is activated, when required, by means of electric heating, which ensures that the oxidation catalytic converter reaches or exhibits its operating temperature of approximately 150° C., in particular after a cold start.

Said embodiment is suitable in particular for hybrid drives which comprise not only the internal combustion engine but also an electric machine which can be connected in terms of drive to the internal combustion engine and which receives power from the internal combustion engine or which, as a switchable auxiliary drive, additionally outputs power. The electrically heatable oxidation catalytic converter may then be supplied with electrical current from the electric machine or from the associated battery.

Embodiments of the internal combustion engine are advantageous in which, downstream of the dosing device, there is provided a catalytic converter for the catalytic assistance of the hydrolysis of isocyanic acid.

Whereas the urea solution is, with a supply of energy, split into ammonia ($NH_3$) and isocyanic acid (HNCO) in a thermolytic reaction, the isocyanic acid (HNCO) can be hydrolyzed in the presence of water ($H_2O$) to form ammonia ($NH_3$) and carbon dioxide ($CO_2$).

According to the present embodiment, a catalytic converter for the catalytic assistance of the hydrolysis of isocyanic acid is provided downstream of the dosing device.

Embodiments of the internal combustion engine are advantageous in which the selective catalytic converter arranged downstream of the oxidation catalytic converter in the exhaust-gas discharge system is formed integrally with a particle filter as a combined exhaust-gas aftertreatment system.

Combined exhaust-gas aftertreatment systems have advantages with regard to the space requirement thereof. The selective catalytic converter and the particle filter may share a common carrier substrate. The oxidation catalytic converter is provided upstream of and spaced apart from the combined exhaust-gas aftertreatment system. In this way, disadvantageous excessive heating of the selective catalytic converter owing to excessively high temperatures of the oxidation catalytic converter can be prevented.

However, embodiments of the internal combustion engine are also advantageous in which a particle filter as a further exhaust-gas aftertreatment system is arranged in the exhaust-gas discharge system upstream of the at least one selective catalytic converter, the oxidation catalytic converter being arranged upstream of the particle filter and the bypass line branching off from the exhaust-gas discharge system upstream of the oxidation catalytic converter and issuing into the exhaust-gas discharge system again between the particle filter and the at least one selective catalytic converter.

Embodiments of the internal combustion engine are advantageous in which a control element is provided by means of which the exhaust-gas flow rate conducted through the bypass line can be adjusted. The control element provided in the bypass line section to control the exhaust gas flow through the bypass in a more targeted manner, for example, based on the engine boost, the exhaust gas temperature, and exhaust gas mass flow. By controlling the flow through a first bypass line section based on engine boost, issues with turbo lag may be reduced.

The control element may be a valve, a slide, a flap, or the like. Said control element may be electrically, hydraulically, pneumatically, mechanically or magnetically actuable, preferably by means of the engine controller, and may be designed to be switchable, that is to say adjustable, in two-stage, multi-stage or continuously variable fashion.

Embodiments of the internal combustion engine are advantageous in which at least one exhaust-gas turbocharger is provided, the compressor of the at least one exhaust-gas turbocharger being arranged in the intake system, and the turbine of the at least one exhaust-gas turbocharger being arranged in the exhaust-gas discharge system.

The advantages of an exhaust-gas turbocharger for example in relation to a mechanical charger are that no mechanical connection for transmitting power exists or is required between the charger and internal combustion engine. While a mechanical supercharger draws the energy required for driving it entirely from the internal combustion engine, the exhaust-gas turbocharger utilizes the exhaust-gas energy of the hot exhaust gases.

The energy imparted to the turbine by the exhaust-gas flow is utilized for driving a compressor which delivers and compresses the charge air supplied to it, whereby supercharging of the cylinders is achieved. A charge-air cooling arrangement may be provided, by means of which the compressed combustion air is cooled before it enters the cylinders.

Supercharging serves primarily to increase the power of the internal combustion engine. Supercharging is however also a suitable means for shifting the load collective toward higher loads for the same vehicle boundary conditions, whereby the specific fuel consumption can be lowered.

A torque drop is often observed when a certain engine rotational speed is undershot. It is sought, using a variety of measures, to improve the torque characteristic of a supercharged internal combustion engine. This is achieved for example by means of a small design of the turbine cross section and simultaneous provision of an exhaust-gas blow-off facility. Such a turbine is also referred to as a wastegate turbine. If the exhaust-gas mass flow exceeds a critical value, then by opening a shut-off element, a part of the exhaust-gas flow is, within the course of the so-called exhaust-gas blow-off, conducted via a bypass line past the turbine or the turbine impeller.

The torque characteristic of a supercharged internal combustion engine may furthermore be improved by means of multiple turbochargers arranged in parallel or in series, that is to say by means of multiple turbines arranged in parallel or in series.

The turbine may furthermore be equipped with a variable turbine geometry, which permits a more precise adaptation to the respective operating point of the internal combustion engine by means of an adjustment of the turbine geometry or of the effective turbine cross section. Here, adjustable guide blades for influencing the flow direction are arranged in the inlet region of the turbine. In contrast to the rotor blades of the rotating rotor, the guide blades do not rotate with the shaft of the turbine.

If the turbine has a fixed, invariable geometry, the guide blades are arranged in the inlet region so as to be not only stationary but rather also completely immovable, that is to say rigidly fixed. In contrast, in the case of a variable geometry, the guide blades are duly also arranged so as to be stationary but not so as to be completely immovable, rather so as to be rotatable, such that the flow approaching the rotor blades can be influenced.

It is sought to arrange the turbine of the exhaust-gas turbocharger as close as possible to the outlet of the internal combustion engine in order thereby to be able to optimally utilize the exhaust-gas enthalpy of the hot exhaust gases, which is determined significantly by the exhaust-gas temperature and the exhaust-gas pressure, and to ensure a fast response behavior of the turbocharger.

In this connection, it is therefore also sought to minimize the thermal inertia of the exhaust-gas discharge system between the outlet and the turbine, which can be achieved by reducing the mass and the length of said part.

Embodiments of the internal combustion engine are therefore also advantageous in which the turbine is arranged in the exhaust-gas discharge system upstream of the at least one further exhaust-gas aftertreatment system.

In this connection, embodiments of the internal combustion engine are advantageous in which the bypass line has two bypass line sections on the inlet side, wherein a first bypass line section branches off from the exhaust-gas discharge system upstream of the turbine, a second bypass line section branches off from the exhaust-gas discharge system downstream of the turbine, and the two bypass line sections merge to form the bypass line, such that a junction point is formed.

Here, embodiments of the internal combustion engine are advantageous in which there is provided at the junction point a control element by means of which the exhaust-gas flow rate conducted through the first bypass line section and the exhaust-gas flow rate conducted through the second bypass line section can be adjusted.

The exhaust-gas flow conducted through the second bypass line section has flowed through the turbine, by contrast to the exhaust-gas flow conducted through the first bypass line section.

The extraction of exhaust gas upstream of the turbine via the first bypass line section reduces the exhaust-gas mass flow through the turbine and results in a lower turbine pressure ratio, as a result of which the charge pressure ratio likewise decreases, which is equivalent to a decreasing charge pressure and a lower compressor mass flow. If too much exhaust gas is extracted via the first bypass line, problems can arise at the compressor side with regard to the surge limit. In this respect, it may be advantageous for the overall exhaust-gas mass flow conducted through the bypass line to be generated by mixing of the two partial exhaust-gas streams of the two bypass line sections.

The temperature and the pressure of the exhaust gas upstream and downstream of the turbine differ, such that mixing of the two partial exhaust-gas streams may for example also be utilized to adjust, as required, the temperature of the overall exhaust-gas mass flow passing through the bypass line.

The second sub-object, that of specifying a method for operating an internal combustion engine of an above-stated type, is achieved by means of a method for operating an internal combustion engine having a control element for the adjustment of the exhaust-gas flow rate conducted through the bypass line, in which method the bypass line is opened in order to supply ammonia as reducing agent to the at least one selective catalytic converter.

That which has already been stated with regard to the internal combustion engine according to the invention also applies to the method according to the invention, for which reason reference is generally made at this juncture to the statements made with regard to the internal combustion engine.

Method variants are advantageous in which the bypass line is opened if the exhaust-gas temperature $T_{exhaust\ gas}$ is lower than a predefinable minimum exhaust gas temperature $T_{exhaust\ gas,\ min}$.

The exhaust-gas temperature in the catalytic converter, at the inlet into the catalytic converter or the exhaust-gas temperature in the bypass line, in particular at the location at which the liquid urea is introduced, may be used as reference exhaust-gas temperature $T_{exhaust\ gas,\ min}$.

Embodiments of the method are advantageous in which the exhaust-gas temperature $T_{exhaust\ gas}$ is determined mathematically. The mathematical determination of the exhaust-gas temperature is carried out by means of simulation, for which use is made of models known from the prior art, for example dynamic heat models and kinetic models for determining the reaction heat generated during the combustion. As input signals for the simulation, use is made preferably of operating parameters of the internal combustion engine which are already available, that is to say which have been determined for other purposes.

The simulation calculation is characterized in that no further components, in particular no sensors, need be provided in order to determine the exhaust-gas temperature, which is expedient with regard to costs. It is however a disadvantage that the exhaust-gas temperature determined in this way is merely an estimated value, which can reduce the quality of the control or regulation.

For the estimation of an exhaust-gas temperature $T_{exhaust\ gas}$ at one location in the exhaust-gas discharge system, use may be made of the exhaust-gas temperature at another location in the exhaust-gas discharge system, which is for example also detected by measurement by means of a sensor.

Embodiments of the method are advantageous in which the exhaust-gas temperature $T_{exhaust\ gas}$ is directly detected by measurement by means of a sensor.

The detection of a temperature by measurement provides more accurate temperature values, but may be difficult. This applies for example to the detection of the temperature of an exhaust-gas aftertreatment system by measurement, in which the lack of a possibility of arranging a temperature sensor in the exhaust-gas aftertreatment system can pose problems.

In contrast, the detection of the exhaust-gas temperature in the bypass line by measurement does not pose any difficulties.

Nevertheless, method variants may be advantageous in which the bypass line is opened if the exhaust-gas temperature $T_{exhaust\,gas}$ at the at least one selective catalytic converter is lower than a predefinable minimum exhaust-gas temperature $T_{exhaust\,gas,\,min}$. Here, the exhaust-gas temperature at the catalytic converter may be equated with the catalytic converter temperature $T_{SCR}$, i.e. the component temperature, and vice versa.

Embodiments of the method are advantageous in which the exhaust gas flow through the bypass line is controlled with respect to the engine torque.

Figure 1:
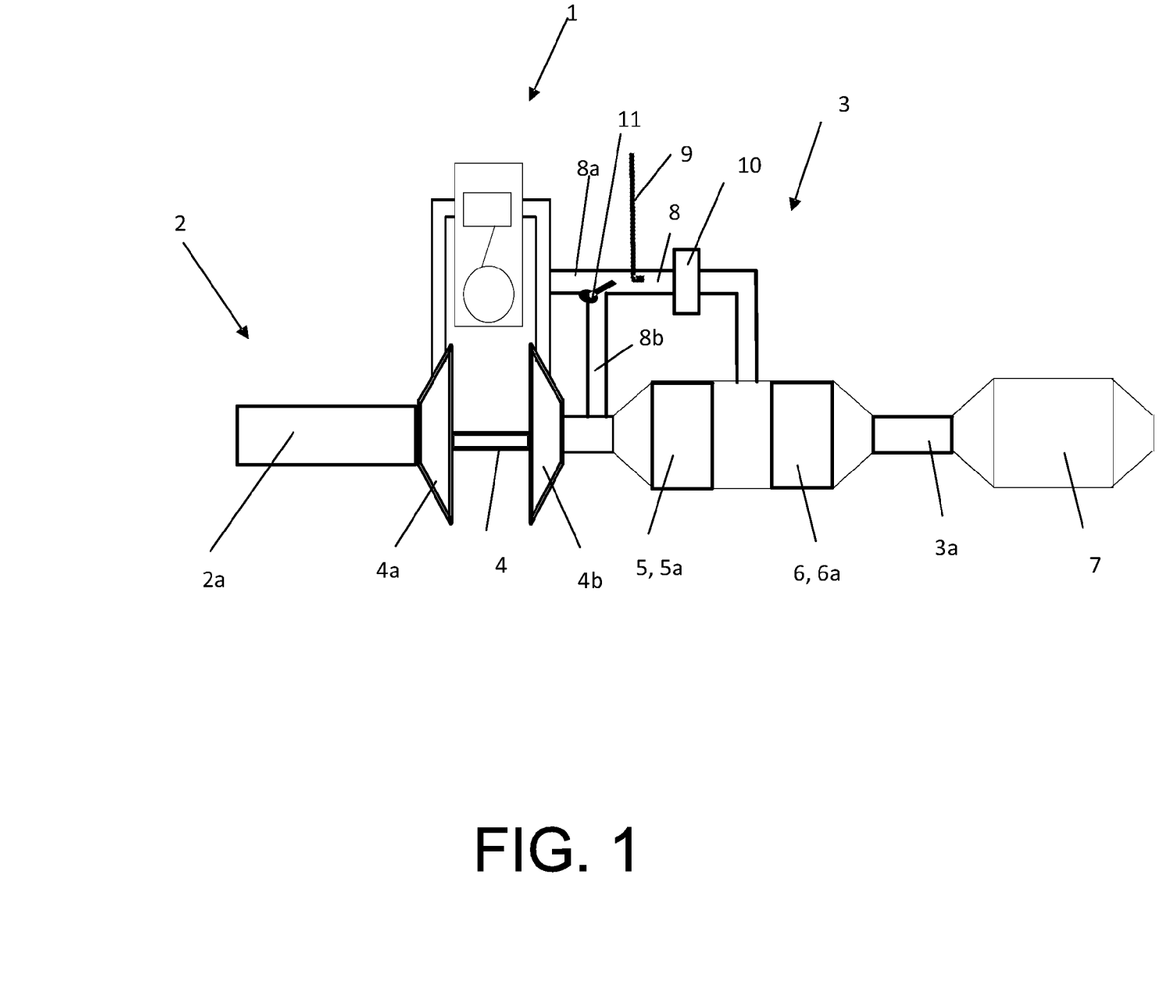
FIG. 1 schematically shows, in the form of a diagrammatic sketch, a first embodiment of the internal combustion engine.

Turning to FIG. 1 a first embodiment of an internal combustion engine 1 is shown comprising an intake system 2 for the supply of charge air and an exhaust gas discharge system 3 for the discharge of exhaust gases. A turbocharger 4 is provided with a compressor 4a arranged in an intake line 3a of the intake 3 and a turbine 4b arranged in an exhaust line 3a of the exhaust gas discharge system 3.

Various systems for exhaust gas aftertreatment are provided downstream of the turbine 4b in the exhaust line. In a first embodiment, shown in FIG. 1, two selective catalytic reduction (SCR) catalysts 6, 7 are provided for the reduction of NOx wherein a further exhaust gas aftertreatment system 5 is arranged upstream of the SCR catalysts 6, 7. The further exhaust gas aftertreatment system 5 is, for example, an oxidation catalytic converter 5a. The first SCR catalyst 6, which is arranged downstream of the oxidation catalytic converter is formed integrally with a particle filter 6a. The second SCR catalyst 7 is arranged downstream of the first SCR catalyst 6. A bypass line 8 is formed by two bypass line sections 8a, 8b which branch upstream and downstream of the turbine 4b. The bypass line issues into the exhaust line 3a upstream of the two SCR catalysts 6, 7 and downstream of the further exhaust gas aftertreatment system 5. A dosing device 9 is provided for introducing a reductant into the bypass line 8 in order to be able to generate or provide ammonia which serves as reducing agent for the selective catalytic converters 6, 7. For example, liquid urea may be used. A mixer 10 is provided in the bypass line 8 downstream of the dosing device 9, which mixer mixes the ammonia, which serves as reducing agent, with the exhaust gas in order to form as homogeneous an exhaust gas-ammonia mixture as possible, which flows through the catalytic converters 6, 7. A mixer 10 may be provided on the bypass line 8 to ensure better mixing of the reductant and exhaust gas flow. Further the mixer 10 may include a heater to better control the temperature of the exhaust gas.

A first bypass line section 8a delivers exhaust gas to the bypass line 8 from upstream of the turbine 4b. A second bypass line section delivers exhaust gas to the bypass line 8 from downstream of the turbine 4b and upstream of the aftertreatment system 5. A control element 11 is arranged in the junction of the two bypass line sections 8a, 8b. The first flow and the second flow of exhaust gases are passed into bypass line 8 to create an overall exhaust gas mass flow in the bypass line. The overall exhaust gas mass flow may be adjusted by adjusting control element 11 as required for engine boost, exhaust temperature, reductant mixing, etc. Control element 11 may be a valve, a slide, a flap, or the like. Said control element may be electrically, hydraulically, pneumatically, mechanically or magnetically actuable, preferably by means of the engine controller, and may be designed to be switchable, that is to say adjustable, in two-stage, multi-stage or continuously variable fashion.

Figure 2:
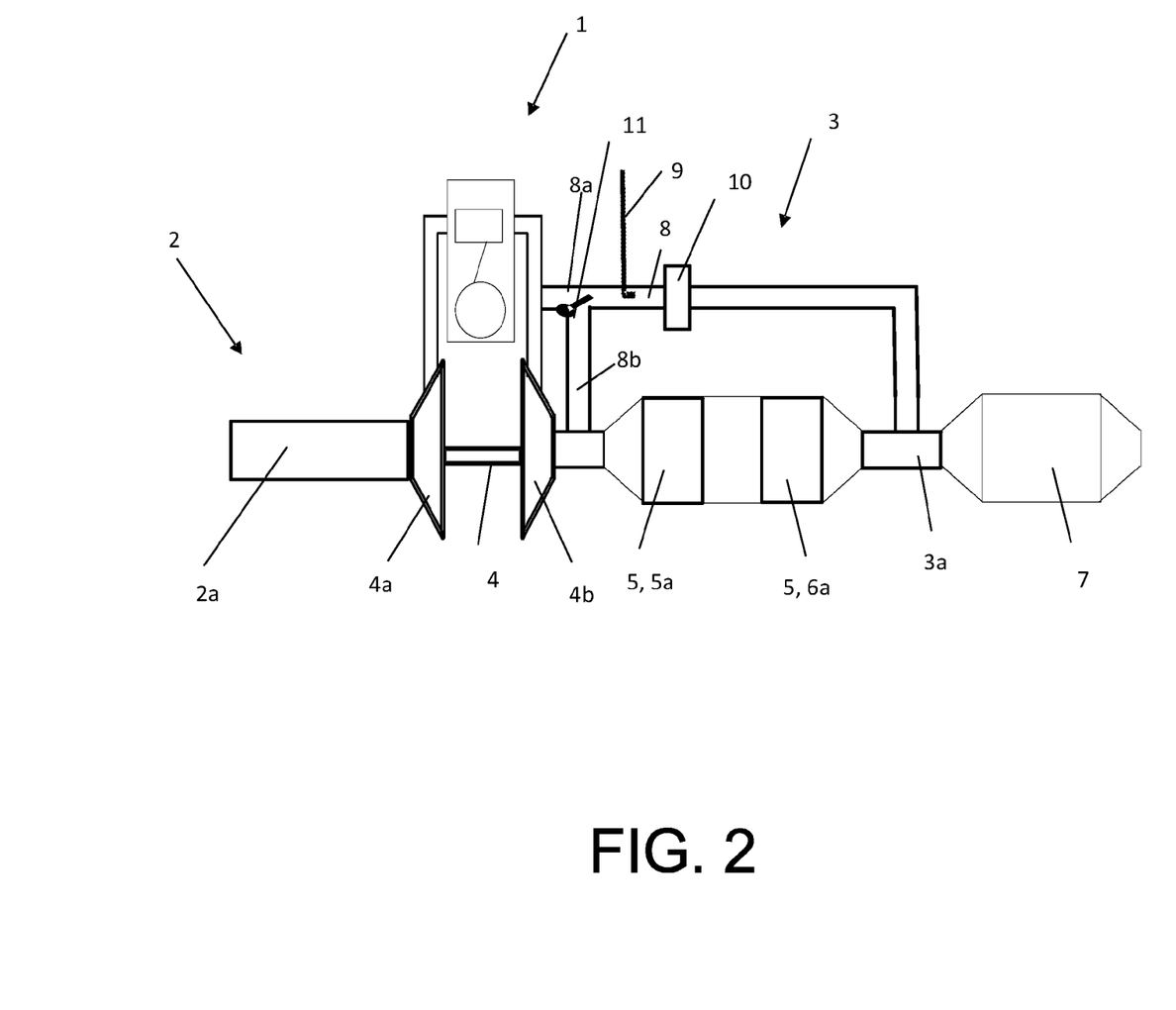
FIG. 2 schematically shows, in the form of a diagrammatic sketch, a second embodiment of the internal combustion engine.

Turning to FIG. 2 a second embodiment of the internal combustion engine 1 is shown schematically. FIG. 2 shows an exhaust gas aftertreatment system arranged in the exhaust line 3. By contrast to the first embodiment of FIG. 1 no combined exhaust gas aftertreatment system comprising a selective catalytic reduction catalyst integrally formed with a particle filter is provided in the case of the internal combustion engine 1 is shown in FIG. 2. An oxidation catalytic converter 5a and a particle filter 6a as the further exhaust gas aftertreatment system 5 are provided upstream of a single SCR catalyst 7. The bypass line 8 issues into the exhaust gas line 3a upstream of the SCR catalyst 7 and downstream the particle filter 6a.

Figure 3:
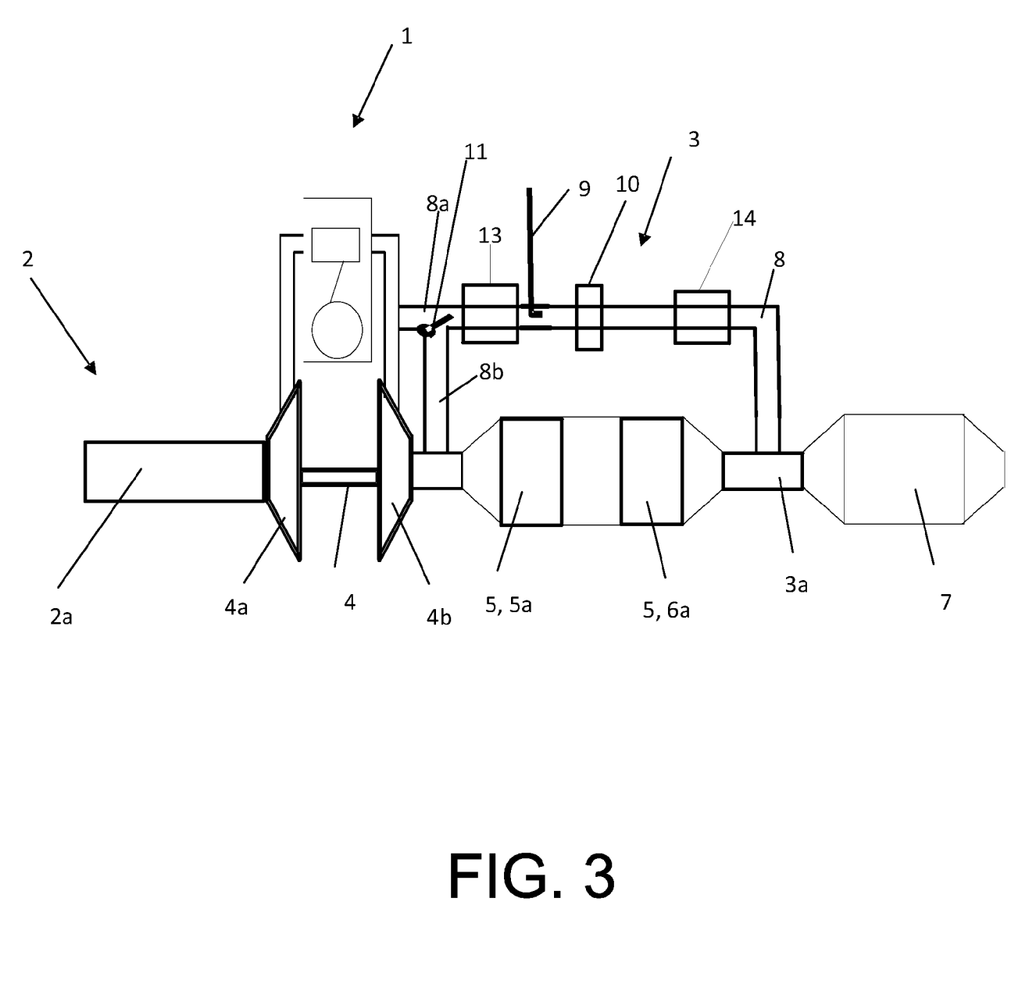
FIG. 3 schematically shows, in the form of a diagrammatic sketch, the embodiments further expanded.

Turning to FIG. 3 the concept may be further expanded by the addition of an electrically heated oxidation catalyst 13 and/or a hydrolysis catalyst 14 in the bypass line 8 shown on the second embodiment as an example. The electrically heated oxidation catalyst 13 may be upstream of the dosing device 9 and may combust the HC and CO in the exhaust gas. The hydrolysis catalyst 14 may be downstream of the mixer 10 to promote achieving higher conversion efficiencies of the reductant.

Figure 4A:
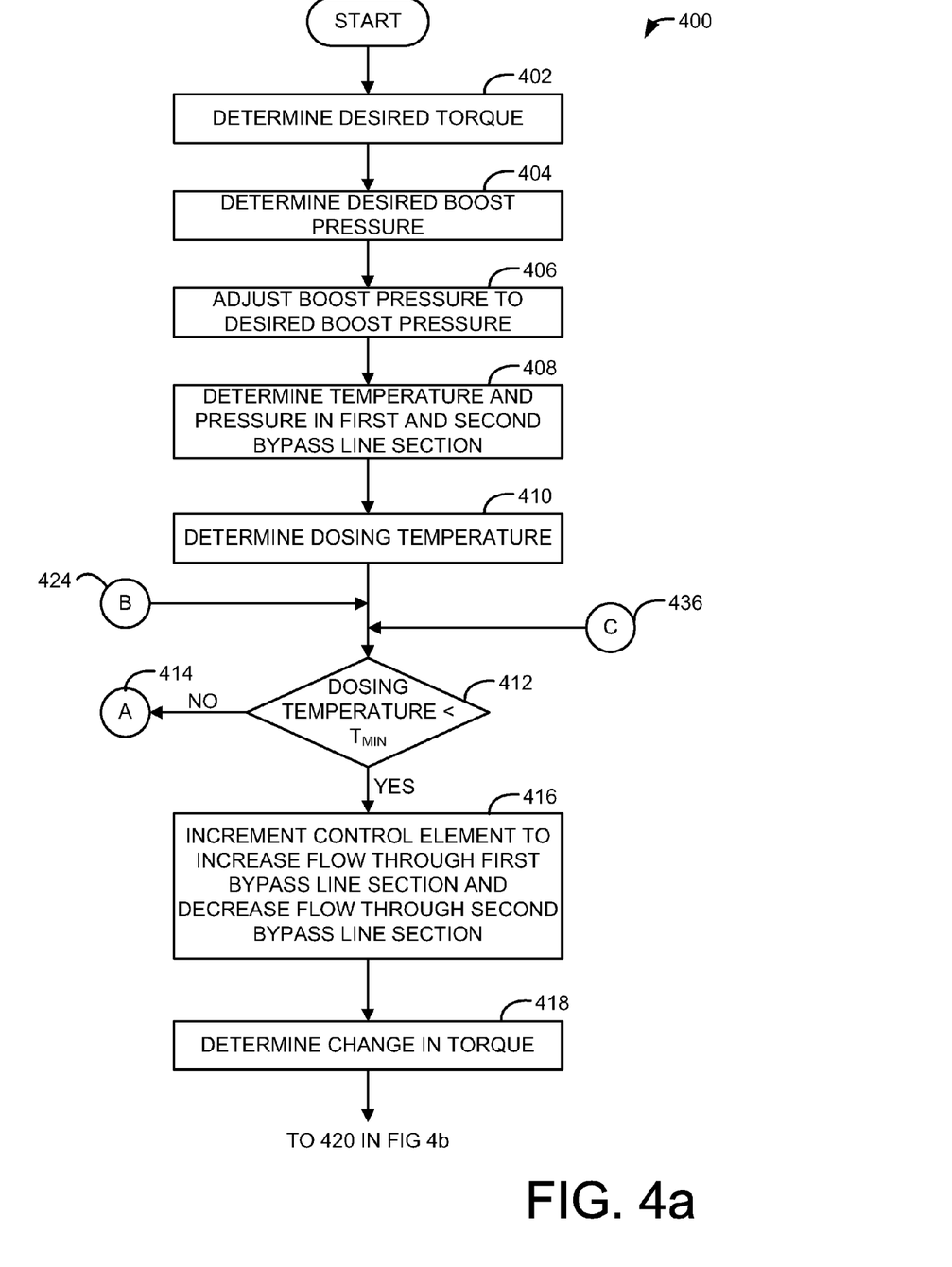
FIGS. 4a-b show an example method to operate the exhaust gas discharge system.
Figure 4B:
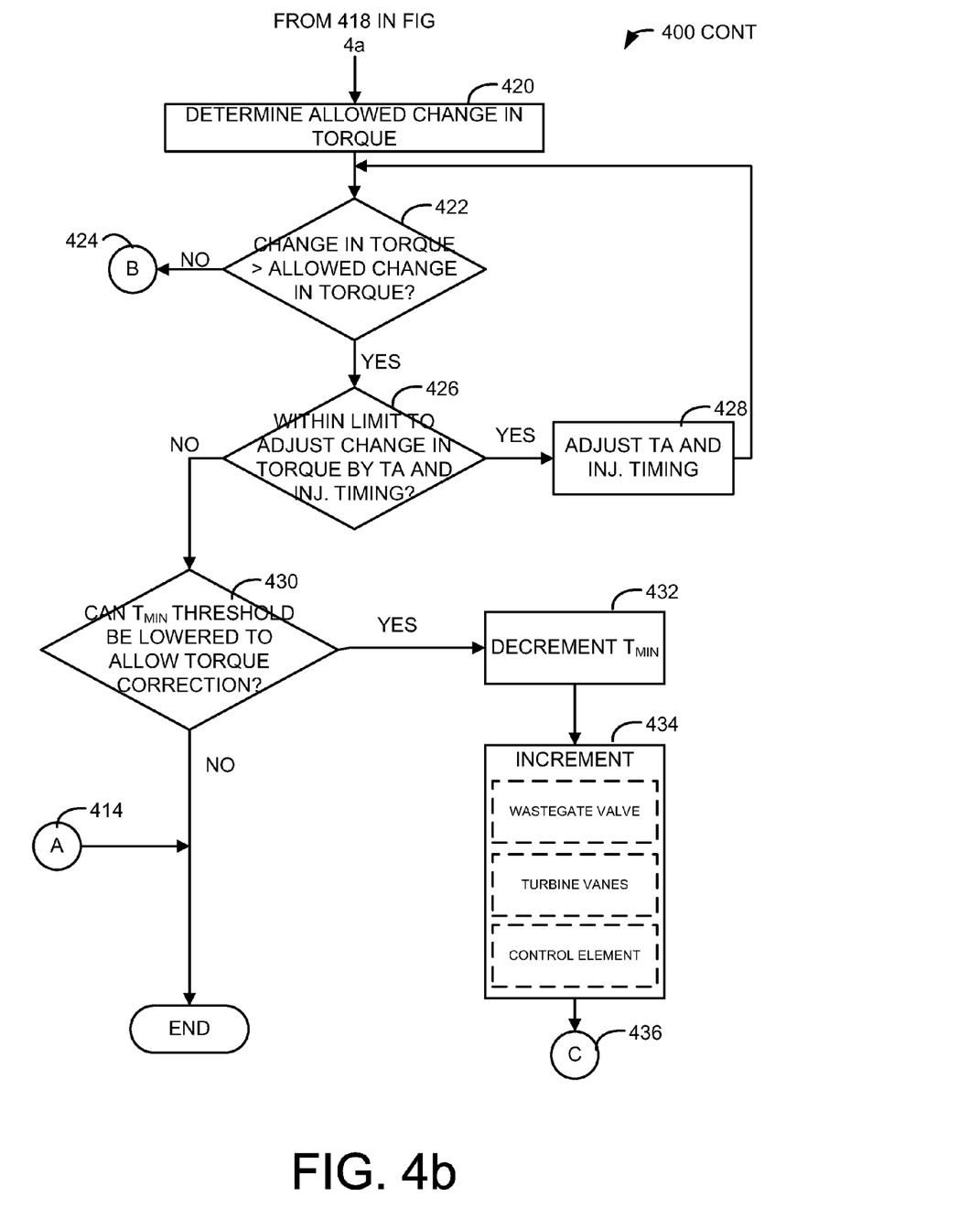

Turning to FIGS. 4a and 4b an example method to control temperature of dosing element 9 and the reductant is given. First, the method may adjust the boost pressure by either the wastegate valve, variable turbo nozzle valve, or the control element. Further the method may determine to adjust air flow through the two bypass line sections to control the dosing temperature for adding a reductant.

At 402 the method may determine the desired torque. The desired torque may be determined from engine speed, driver input, various sensors, etc.

At 404 the method may determine the boost pressure desired for the desired torque at step 402.

At 406 the method may adjust the boost pressure to the boost pressure desired determined at 404. The boost pressure may be adjusted to meet the boost pressure desired by adjusting one or more of the following: the wastegate valve, the variable turbo nozzle, and/or the control element.

At 408 the method may determine the temperature and pressure in the first bypass line and second bypass line. For example, the temperature and pressure may be measured by sensors or be estimated from the boost pressure.

At 410 the dosing temperature may be determined. The dosing temperature may be determined from the temperature and pressure of the first and second bypass lines determined at 408. As another example, the dosing temperature may be measured by a sensor.

At 412 the method may determine if the dosing temperature is below a minimum temperature $T_{min}$ threshold. If no, the method may continue to 414 and no further steps are necessary. If yes, the method may continue to 416.

At 416, the method may increment the control element to increase the exhaust gas flow through the first bypass line and decrease the exhaust gas flow through the second bypass line. The exhaust gas flow in the first bypass line is taken upstream of the turbo and the exhaust gas flow in the second bypass line is taken downstream of the turbo.

At 418 the method may determine the change in torque m based on the change to the control element at 416.

At 420 the method may determine the allowed change in torque. The allowed change in torque may be determined based on engine load, tip in, engine temperature, etc. For example, at low load the allowed change in torque may have a greater range and the method may give more weight to temperature regulation of the bypass line. As another example, at high load or medium load and tip in, the allowed change in torque may have a lower range and the method may give a lower weight to temperature regulation of the bypass line.

At 422 the method may determine if the change in torque is greater than the allowed change in torque. If no, the method may continue to 424 and rejoin the method at step 412. If yes, the method may continue on to 426.

At 426 the method may determine if the change in torque is within a limit to be adjusted by throttle angle TA and/or injection timing. If no, the change in torque is outside the limit the method may continue to 430. If yes, the change in torque is within the limit the method may continue to 428.

At 428 the method may adjust the throttle angle and/or injection timing to enact a change in the torque. The method may then continue to 422 and determine a new change in torque and compare to the allowed change in torque.

At 430 the method may determine if the minimum threshold temperature $T_{min}$ may be lowered to allow for a torque correction based on the present operating conditions. If no, the method may end. If yes, the method may continue to 432.

At 432 the method may decrement the minimum threshold temperature $T_{min}$.

At 434 the method may increment the wastegate valve, the turbine vanes, or the control element to allow for torque correction. The method may then continue to 436 and rejoin the method at 412.

Figure 5:
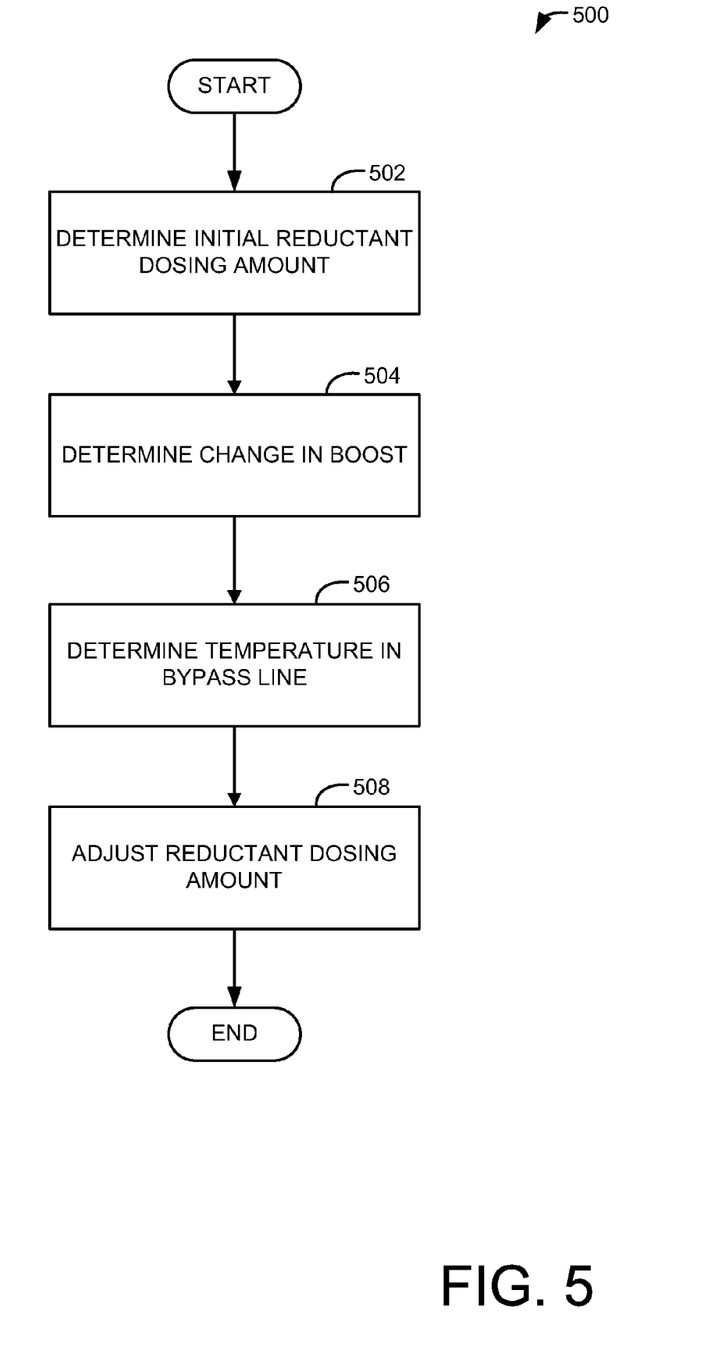
FIG. 5 shows an example method to adjust the reductant amount.

Turning to FIG. 5 an example method 500 to adjust the reductant dosing amount is shown. At 502 an initial reductant dosing amount is determined based on the engine operating conditions and requested engine torque.

At 504 the method may determine if a change in boost occurred.

At 506 the method may determine the temperature in the bypass line and/or SCR catalyst.

At 508 the method may determine an amount of reductant to dose based on the change in boost, temperature in the bypass line, and temperature in the SCR catalyst.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. An internal combustion engine comprising:
an intake system for the supply of charge air;
an exhaust-gas discharge system for the discharge of exhaust gases, the exhaust-gas discharge system further comprises;
  at least one selective catalytic converter arranged in the exhaust-gas discharge system and which serves for the reduction of nitrogen oxides;
  an oxidation catalytic converter being arranged, as a further exhaust-gas aftertreatment system, in the exhaust-gas discharge system upstream of the at least one selective catalytic converter;
  a bypass line branches off from the exhaust-gas discharge system upstream of the oxidation catalytic converter and issues into the exhaust-gas discharge system again between the oxidation catalytic converter and the at least one selective catalytic converter; and
  a dosing device provided for introducing liquid urea as a reducing agent for the at least one selective catalytic converter into the bypass line;
  a particle filter as a further exhaust-gas aftertreatment system arranged in the exhaust-gas discharge system upstream of the at least one selective catalytic converter, the oxidation catalytic converter being arranged upstream of the particle filter, and the bypass line comprising two bypass lines, a first bypass line of the two bypass lines branching from the exhaust-gas discharge system upstream of a turbine, a second of the two bypass lines branching off from the exhaust-gas discharge system upstream of the oxidation catalytic converter and issuing into the exhaust-gas discharge system again between the particle filter and the at least one selective catalytic converter, the first bypass line joining the second bypass line downstream of the turbine.

2. The internal combustion engine as claimed in claim 1, further comprising a mixer provided in the bypass line downstream of the dosing device.

3. The internal combustion engine as claimed in claim 2, wherein the mixer is heatable.

4. The internal combustion engine as claimed in claim 1, further comprising an electrically heatable oxidation catalytic converter provided in the bypass line upstream of the dosing device.

5. The internal combustion engine as claimed in claim 1, further comprising a catalytic converter for the catalytic assistance of hydrolysis of isocyanic acid, downstream of the dosing device.

6. The internal combustion engine as claimed in claim 1, wherein the at least one selective catalytic converter arranged downstream of the oxidation catalytic converter in the exhaust-gas discharge system is formed integrally with the particle filter as a combined exhaust-gas aftertreatment system.

7. The internal combustion engine as claimed in claim 1, further comprising a control element for adjusting an exhaust-gas flow rate conducted through the bypass line.

8. The internal combustion engine as claimed in claim 1, further comprising at least one exhaust-gas turbocharger, a compressor of the at least one exhaust-gas turbocharger being arranged in the intake system, and the turbine of the at least one exhaust-gas turbocharger being arranged in the exhaust-gas discharge system.

9. The internal combustion engine as claimed in claim 8, wherein the turbine is arranged in the exhaust-gas discharge system upstream of the exhaust-gas aftertreatment system.

10. An internal combustion engine comprising:
an intake system for the supply of charge air;
an exhaust-gas discharge system for the discharge of exhaust gases, the exhaust-gas discharge system further comprises;
  at least one selective catalytic converter arranged in the exhaust-gas discharge system and which serves for the reduction of nitrogen oxides;
  an oxidation catalytic converter being arranged, as a further exhaust-gas aftertreatment system, in the exhaust-gas discharge system upstream of the at least one selective catalytic converter;
  a bypass line branching off from the exhaust-gas discharge system upstream of the oxidation catalytic converter and issuing into the exhaust-gas discharge system again between the oxidation catalytic converter and the at least one selective catalytic converter; the bypass line having two bypass line sections on the inlet side further comprising:
    a first bypass line section branching off from the exhaust-gas discharge system upstream of a turbine;
    a second bypass line section branching off from the exhaust-gas discharge system downstream of the turbine; and the two bypass line sections merging to form the bypass line, such that a junction point is formed;

a dosing device provided for introducing liquid urea as a reducing agent for the at least one selective catalytic converter into the bypass line; and at least one exhaust-gas turbocharger, a compressor of the at least one exhaust-gas turbocharger being arranged in the intake system, and the turbine of the at least one exhaust-gas turbocharger being arranged in the exhaust-gas discharge system, wherein the turbine is arranged in the exhaust-gas discharge system upstream of the exhaust-gas aftertreatment system.

11. The internal combustion engine as claimed in claim 10, further comprising a control element at a junction point for adjusting an exhaust-gas flow rate conducted through the first bypass line section and an exhaust-gas flow rate conducted through the second bypass line section.

12. A method for operating an internal combustion engine as claimed in claim 1, further comprising a control element for the adjustment of an exhaust-gas flow rate conducted through the bypass line, wherein the bypass line is opened in order to supply ammonia as a reducing agent to the at least one selective catalytic converter.

13. The method as claimed in claim 12, wherein the bypass line is opened if an exhaust-gas temperature $T_{exhaust\ gas}$ is lower than a predefinable minimum exhaust gas temperature $T_{exhaust\ gas,\ min}$.

14. A method for controlling an engine, comprising:
merging exhaust flow from both upstream and downstream of a turbocharger turbine, a valve being adjusted responsive to desired boost to vary a first amount of the upstream exhaust merging with the downstream exhaust;

directing a remaining portion of the unmerged upstream exhaust to bypass an upstream emission device and receive injected urea to then be delivered to a Selective Catalytic Reducer (SCR);

further adjusting the valve responsive to a temperature of a reductant; and adjusting engine operation to increase engine torque if the further adjusting of the valve reduces engine torque greater than a threshold.

15. The method recited in claim 14 wherein the remaining portion bypasses an oxidation catalyst and a particulate filter.

16. The method recited in claim 15 wherein the remaining portion bypasses an oxidation catalyst.

17. The method recited in claim 14 wherein temperature of said reductant is increased by increasing said first amount of the upstream exhaust.

18. The method recited in claim 17 wherein adjusting engine operation includes adjusting injection timing.

* * * * *